United States Patent
Shishida et al.

(10) Patent No.: US 10,367,181 B2
(45) Date of Patent: Jul. 30, 2019

(54) LITHIUM-ION BATTERY

(71) Applicant: Panasonic Intellectual Property Management Co., Ltd., Osaka (JP)

(72) Inventors: Yoshinori Shishida, Osaka (JP); Kenji Date, Hyogo (JP); Takao Kuromiya, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 261 days.

(21) Appl. No.: 15/265,262

(22) Filed: Sep. 14, 2016

(65) Prior Publication Data
US 2017/0125765 A1 May 4, 2017

(30) Foreign Application Priority Data

Oct. 30, 2015 (JP) ................................ 2015-213564
Jun. 24, 2016 (JP) ................................ 2016-125034

(51) Int. Cl.
*H01M 4/133* (2010.01)
*H01M 2/16* (2006.01)
*H01M 10/0525* (2010.01)
*H01M 4/131* (2010.01)

(52) U.S. Cl.
CPC ......... *H01M 2/1686* (2013.01); *H01M 4/131* (2013.01); *H01M 4/133* (2013.01); *H01M 10/0525* (2013.01)

(58) Field of Classification Search
CPC .... H01M 4/36; H01M 10/0525; H01M 4/133; H01M 4/134; H01M 4/38; H01M 4/587; H01M 4/364; H01M 4/386; H01M 4/13
See application file for complete search history.

(56) References Cited

U.S. PATENT DOCUMENTS

| | | | |
|---|---|---|---|
| 2006/0078791 A1* | 4/2006 | Hennige | H01M 2/1646 429/145 |
| 2008/0213670 A1 | 9/2008 | Okada et al. | |
| 2009/0191460 A1* | 7/2009 | Fujiwara | H01M 4/0402 429/209 |
| 2010/0124700 A1* | 5/2010 | Schaefer | H01M 2/16 429/144 |
| 2012/0034509 A1* | 2/2012 | Bae | H01M 2/1653 429/145 |
| 2013/0255075 A1 | 10/2013 | Fujimaki et al. | |
| 2014/0170464 A1* | 6/2014 | Iwase | H01M 2/166 429/144 |

(Continued)

FOREIGN PATENT DOCUMENTS

| EP | 3198668 | * 9/2015 |
|---|---|---|
| JP | 2008-251527 | 10/2008 |

(Continued)

*Primary Examiner* — Alexander Usyatinsky
(74) *Attorney, Agent, or Firm* — Panasonic IP Management; Kerry S. Culpepper (57) ABSTRACT

A separator includes a separation functional layer and a support layer. The separation functional layer is configured as a denser layer with a smaller pore size and a lower porosity than the support layer. Accordingly, movement of metal foreign objects from the positive electrode plate side to the negative electrode plate side, and precipitation of metal foreign objects on the negative electrode plate side can be inhibited, thereby making it possible to ensure battery performance and safety.

10 Claims, 6 Drawing Sheets

(56) References Cited

U.S. PATENT DOCUMENTS

| | | | |
|---|---|---|---|
| 2015/0010798 | A1 | 1/2015 | Sawai et al. |
| 2015/0295216 | A1* | 10/2015 | Okuno ................ H01M 2/1653 320/128 |
| 2018/0233729 | A1* | 8/2018 | Liimatainen ............ C23C 14/28 |

FOREIGN PATENT DOCUMENTS

| | | |
|---|---|---|
| JP | 2013-127857 | 6/2013 |
| JP | 2013-178934 | 9/2013 |
| JP | 2014-120291 | 6/2014 |
| JP | 2015-170403 A | 9/2015 |
| WO | 2012/081128 A1 | 6/2012 |

\* cited by examiner

LITHIUM-ION BATTERY

TECHNICAL FIELD

The technical field relates to lithium-ion batteries that include a separator between a positive electrode and a negative electrode.

BACKGROUND

A lithium-ion battery has a configuration including a positive electrode containing an active material lithium transition metal oxide, a negative electrode containing active material carbon, an electrolytic solution containing an organic solvent dissolving a lithium salt, and a separator disposed between the positive electrode and the negative electrode.

The electrodes of a lithium-ion battery have a risk of contamination by metal foreign objects such as iron, copper, zinc, tin, cobalt, nickel, and chromium. Such contaminating metal foreign objects have a possibility of entering the battery in the form of a solid or ions. The contaminating metal foreign objects may cause an output voltage drop, or heat or fire defects in the lithium-ion battery. Particularly, when entry of metal foreign objects occurs in the vicinity of the positive electrode, the metal foreign objects become ionized under an inner electric field, and induced to the negative electrode side. Such ions precipitate on the negative electrode, and form dendrites, which grow and reach the positive electrode from the negative electrode, and short the positive and negative electrodes. Such shorting causes an OCV (Open Circuit Voltage) failure involving an output voltage drop, and, even worse, heat or fire defects.

In order to reduce such defects due to metal foreign objects, it has been proposed to handle a lithium-ion battery in a configuration in which the positive and negative electrodes are in contact with a coating separator. With such a structure, there will be no gap between the electrodes and the separator, and contaminating metal foreign objects do not come into contact with the electrodes during assembly, making it difficult for dendrites to occur from metal foreign objects (see, for example, JP-A-2013-127857).

SUMMARY

While the metal foreign objects that enter during the assembly can be deactivated in the lithium-ion batteries of related art, it is not possible to remove the metal foreign objects that have entered the positive electrode in previous steps. Upon ionization in the positive electrode, the ionized metal foreign objects move to the negative electrode, and generate dendrites therein. The generated dendrites short the positive electrode and the negative electrode, and cause an output voltage drop in the lithium-ion battery, or generate heat or fire in the lithium-ion battery. These are problematic as they lead to poor battery performance and poor safety.

In view of the foregoing problems, as well as other concerns, the present disclosure concerns a lithium-ion battery in which the battery performance and safety are ensured.

The lithium-ion battery of an aspect of the present disclosure includes:

a positive electrode plate containing a lithium metal oxide as a positive electrode active material;

a negative electrode plate containing carbon as a negative electrode active material;

a separator having a first surface, and a second surface opposite the first surface, the separator being disposed between the positive electrode plate and the negative electrode plate with the first surface contacting the negative electrode plate, and the second surface contacting the positive electrode plate; and an electrolytic solution of a lithium ion dissolved as an electrolyte in an organic solvent, wherein the separator includes a support layer, and a separation functional layer having a smaller pore size and a lower porosity than the support layer, and wherein one of the support layer and the separation functional layer is disposed on the side of the first surface, and the other is disposed on the side of the second surface.

According to this configuration, a separator is used that includes a separation functional layer and a support layer, and in which the separation functional layer is configured as a denser layer with a smaller pore size and a lower porosity than the support layer. This enables inhibiting movement of metal foreign objects from the positive electrode side to the negative electrode side, and inhibits precipitation of metal foreign objects on the negative electrode side, making it possible to ensure battery performance and safety.

DESCRIPTION OF EMBODIMENTS

An embodiment of the present disclosure is described below with reference to the accompanying drawings.

In the following descriptions, configurations having the same effects are referred to by the same reference numerals, and descriptions thereof are omitted, as appropriate.

First Embodiment

Figure 1:
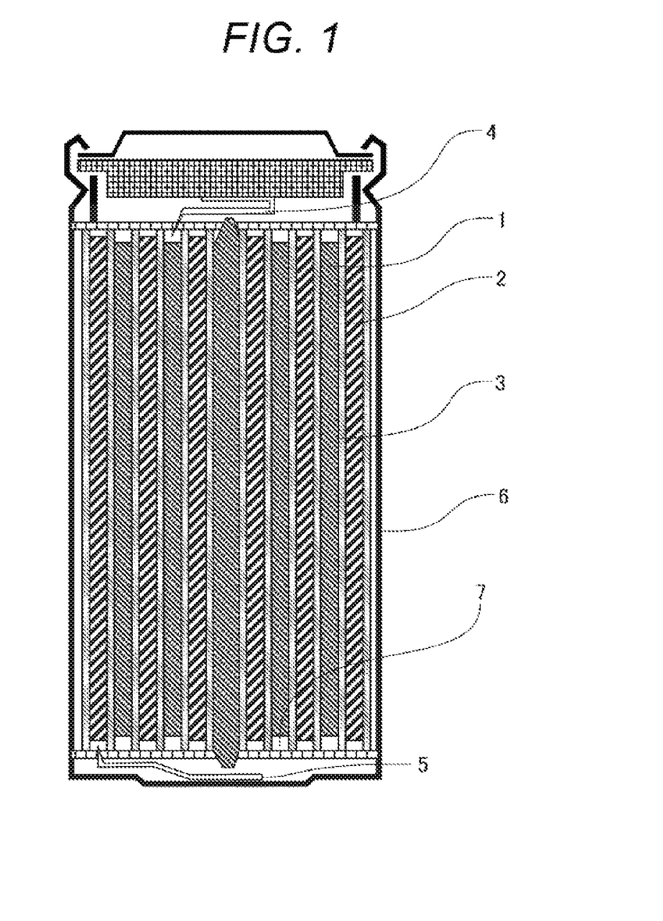
FIG. 1 is a cross sectional view illustrating a configuration of a cylindrical lithium-ion battery as an embodiment of the present disclosure.

FIG. 1 is a cross sectional view illustrating a configuration of a cylindrical lithium-ion battery as an embodiment of the present disclosure. The cylindrical lithium-ion battery illustrated in FIG. 1 includes a positive electrode plate 1 and a negative electrode plate 2, which are alternately laminated to each other. Between the positive electrode plate 1 and the negative electrode plate 2 is a separator 3, which is disposed to prevent physical contact between the positive electrode plate 1 and the negative electrode plate 2. The laminate of the positive electrode plate 1, the negative electrode plate 2, and the separator 3 is wrapped in a cylindrical fashion, and constitutes the cylindrical lithium-ion battery by being disposed inside a case 6 having components such as a positive electrode tab 4, a negative electrode tab 5, and an electrolytic solution 7. The electrolytic solution 7 is, for example, a solution of a lithium salt dissolved in an organic solvent, and contains lithium ions as the electrolyte.

The structure of the separator 3 is described below with reference to FIG. 2.

Figure 2:
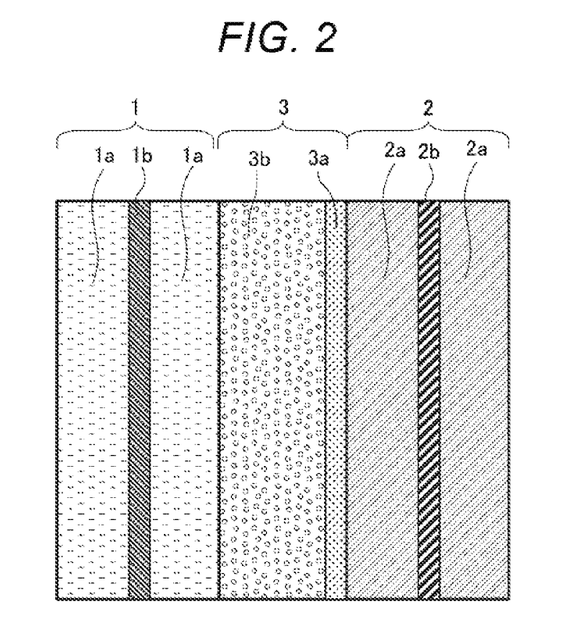
FIG. 2 is a cross sectional view schematically illustrating a configuration of a relevant portion of the positive electrode plate, the negative electrode plate, and the separator of the embodiment of the present disclosure.

FIG. 2 is a cross sectional view schematically illustrating a configuration of a relevant portion of the positive electrode plate, the negative electrode plate, and the separator of the embodiment of the present disclosure.

In a preferred configuration of the separator 3 of the embodiment of the present disclosure, the separator 3 is configured as a laminate of a porous separation functional layer 3a and a porous support layer 3b. The separation functional layer 3a is configured as a low-porosity, dense layer of a small pore size. The support layer 3b is configured as a coarse layer having a lager pore size and higher porosity than the separation functional layer 3a.

As used herein, "pore size" is the diameter of the pore portion of the film in a cross section perpendicular to the longitudinal direction, and "porosity" is the volume proportion of the pore portion in the film volume. Permeability increases as the pore size and the porosity increase, whereas the mechanical strength suffers as the pore size and the porosity increase. Smaller pore sizes allow blocking smaller metal foreign objects. The substance block rate of pores is determined by the pore size, the pore density, and the layer thickness. For example, when the contaminating metal foreign objects are present in the form of solvated ions with a diameter of from 0.8 nm to 1.0 nm, the separation functional layer 3a may have an average pore diameter of from 0.3 nm to 0.8 nm, and a porosity of at most 1%, above 0%.

Note that the pores described herein as having an average diameter of 0.3 nm to 0.8 nm for the sake of explanation translate into a size that matches the interval of the binding chain of the constituent molecules of the film. A size of this range is typically too small to be measured by a common pore size measurement method such as a method using a mercury porosimeter, but can be measured by using a positron annihilation technique or other such methods used for the pore measurement of a functional layer of a reverse osmosis membrane.

The surface of the separator 3 exposing the separation functional layer 3a represents a first surface, and the surface of the separator 3 exposing the support layer 3b represents a second surface. Specifically, the separator 3 has a smaller pore size and porosity on the first surface side than on the second surface side.

The separation functional layer 3a of the present embodiment is a layer with a function to block passage of ions and molecules larger than certain sizes, and to pass ions smaller than certain sizes.

The average thickness of the separation functional layer 3a used in the present embodiment is not particularly limited, and is preferably from 10 nm to 100 nm. Below 10 nm, the possibility of film defects increases as the film strength becomes insufficient. When thicker than 100 nm, the separation functional layer 3a blocks movement of substances that need to be passed for battery reaction, and causes a battery performance drop. Preferably, the average thickness of the separation functional layer 3a is thinner than the average thickness of the support layer 3b.

The material of the separation functional layer 3a is not particularly limited, and is preferably any one of regenerated cellulose, a cellulose ester, polyacrylnitrile, polytetrafluoroethylene, a polyester-based polymer alloy, a polyamide, a polyimide, a polysulfone, a polyethersulfone, polyethylene, polypropylene, polyvinylidene fluoride, a polyvinyl alcohol, an ethylene-vinyl copolymer, and polyvinyl chloride. Particularly preferred are aromatic polyamides, and cellulose acetate.

In the present embodiment, the support layer 3b is a porous layer for supporting the separation functional layer 3a. The support layer 3b is not particularly limited, and is made of, for example, a nonwoven fabric, and a porous film. Because the support layer 3b has a larger pore size and a higher porosity than the separation functional layer 3a, the support layer 3b passes ions that have passed through the separation functional layer 3a.

The average thickness of the support layer 3b used in the present embodiment is not particularly limited, and is preferably from 15 μm to 100 μm. Below 15 μm, a lack of strength increases the possibility of film fracture. Above 100 μm, the volume proportion of the separator in the inner volume of the alkali battery increases, and the proportions of the positive electrode active material and the negative electrode active material become smaller. This leads to low battery capacity.

The pore size formed in the support layer 3b is preferably from 100 nm to 1 μm. When thinner than 100 nm, the probability increases that the insulation between the positive electrode and the negative electrode cannot be ensured. Above 1 μm, the support layer 3b blocks movement of substances that need to be passed for battery reaction, and causes a battery performance drop. The porosity is preferably 50% to 80%. When the porosity is less than 50%, the support layer 3b blocks movement of substances that need to be passed for battery reaction, and causes a battery performance drop. Above 80%, a lack of strength increases the possibility of film fracture.

The material of the support layer 3b is not particularly limited, and is preferably any one of regenerated cellulose, a cellulose ester, a polysulfone, a polyether sulfone, a polyvinyl alcohol, an ethylene-vinyl alcohol copolymer, vinylon, a polyamide, a polyimide, polyethylene, polypropylene, polyester, and polyvinylidene fluoride.

The separator 3 of the present embodiment may be produced as follows. First, the support layer 3b is fabricated, and the separation functional layer 3a is formed on the support layer 3b. The support layer 3b may be fabricated by melting the material of the support layer 3b, or dissolving the support layer material in a predetermined solvent, and processing the material by using a technique such as dry drawing, wet extraction, and bubbling. A solution of the material of the separation functional layer 3a is then applied onto the support layer 3b, and dried to obtain the separator 3, using a die coating method.

The structures of the positive electrode plate 1 and the negative electrode plate 2 are described below referring to the cross sectional structure of the positive electrode plate 1 and the negative electrode plate 2 shown in FIG. 2. The positive electrode plate 1 is structured to include two positive electrode active materials 1a containing a lithium metal oxide and a binder, and a positive electrode collector 1b using a material such as an aluminum foil. The positive electrode active materials 1a and the positive electrode collector 1b are laminated to each other using a binder, with the positive electrode collector 1b sandwiched between the two positive electrode active materials 1a. The negative electrode plate 2 is structured to include two negative electrode active materials 2a containing carbon and a binder, and a negative electrode collector 2b using a material such as a copper foil. The negative electrode active materials 2a, and the negative electrode collector 2b are laminated to each other using a binder, with the negative electrode collector 2b sandwiched between the two negative electrode material 2a.

By using the positive electrode plate 1 and the negative electrode plate 2, and the separator 3 of the foregoing structures, the positive electrode plate 1, the separator 3, the negative electrode plate 2, and the separator 3 are laminated in this order, and wrapped as shown in FIG. 1, and these are inserted into the case 6 with other components, including the positive electrode tab 4, the negative electrode tab 5, and the electrolytic solution 7. The case 6 is then sealed to complete the lithium-ion battery.

In the example shown in FIG. 2, the positive electrode plate 1, the negative electrode plate 2, and the separator 3 are disposed in such an orientation that the support layer 3b and the separation functional layer 3a are in contact with the positive electrode active material 1a and the negative electrode active material 2a, respectively, upon being wrapped. It is, however, possible to dispose the separator 3 so that the support layer 3b and the separation functional layer 3a contact the negative electrode active material 2a and the positive electrode active material 1a, respectively.

By using the separator 3 configured from the separation functional layer 3a and the support layer 3b in which the separation functional layer 3a is configured as a dense layer having a smaller pore size and a lower porosity than the support layer 3b, the separation functional layer 3a can function to inhibit passage of polyvalent metal ions, and the overall mechanical strength of the separator 3 can be maintained without lowering the liquid permeability through the support layer 3b.

The separation functional layer 3a has the pore size and the porosity sufficient to inhibit passage of metal foreign object ions while allowing sufficient passage of lithium ions in the electrolytic solution 7, and is thin enough not to reduce the permeability of the electrolytic solution 7 and lithium ions.

The support layer 3b is thick enough to provide sufficient mechanical strength for the separator 3, and has a pore size and a porosity that are large enough not to affect the permeability of the electrolytic solution 7 and lithium ions. In this way, any contaminating metal foreign object that has entered the positive electrode plate 1 during previous steps can be blocked to prevent dendrite generation, and precipitation of metal foreign objects on the negative electrode plate 2 can be inhibited to ensure battery performance and safety.

The present disclosure is described below in greater detail by way of specific examples.

Figure 3:
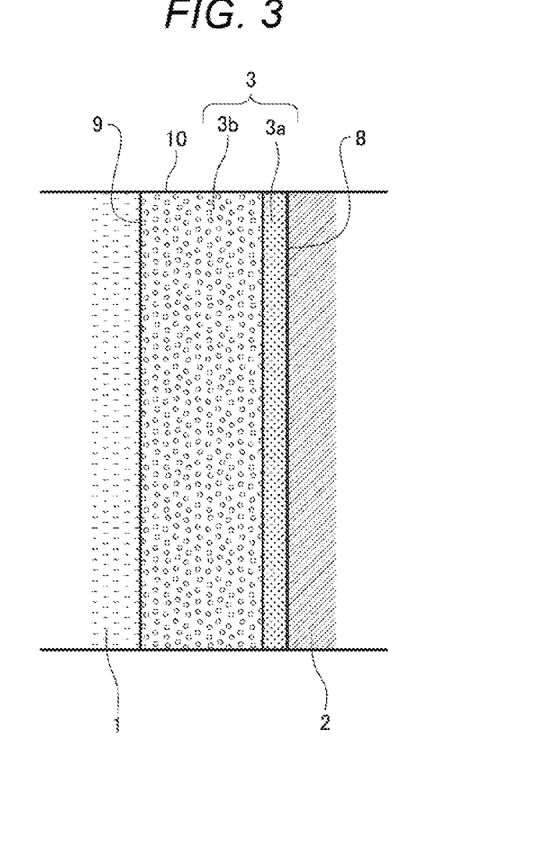
FIG. 3 is a diagram illustrating a configuration of the separator of Example 1.
Figure 4:
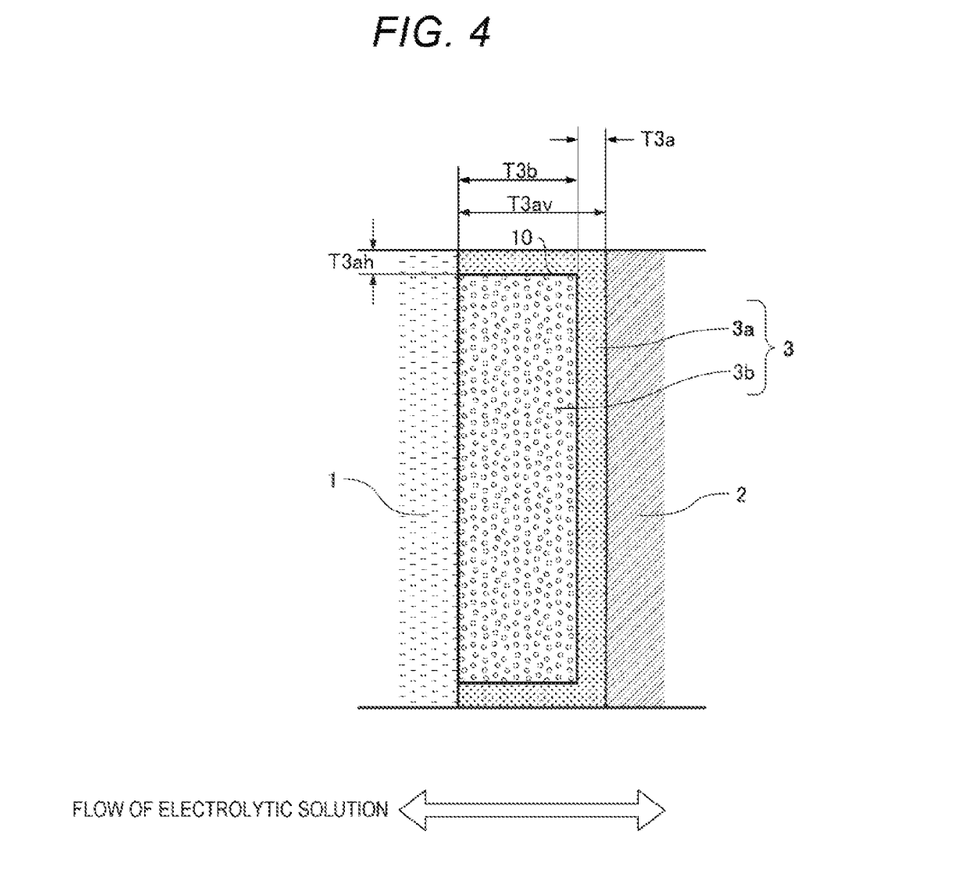
FIG. 4 is a diagram illustrating a configuration of the separator of Example 2.
Figure 5:
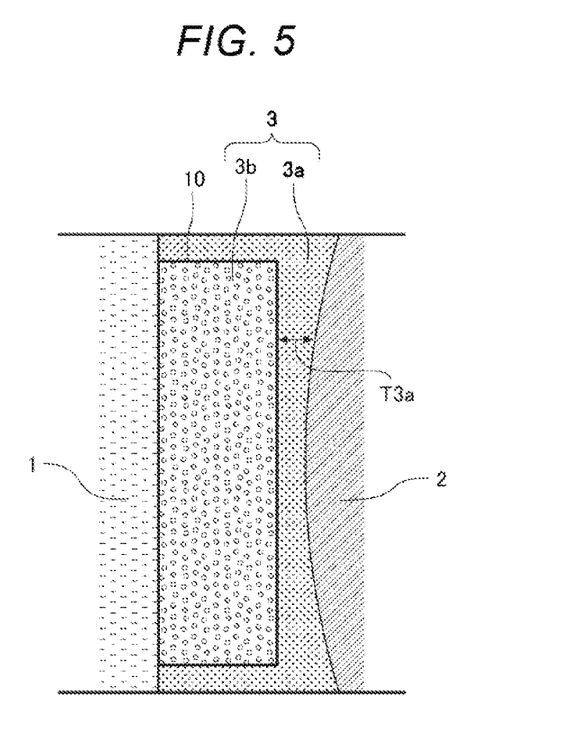
FIG. 5 is a diagram illustrating a configuration of the separator of Example 3.
Figure 6:
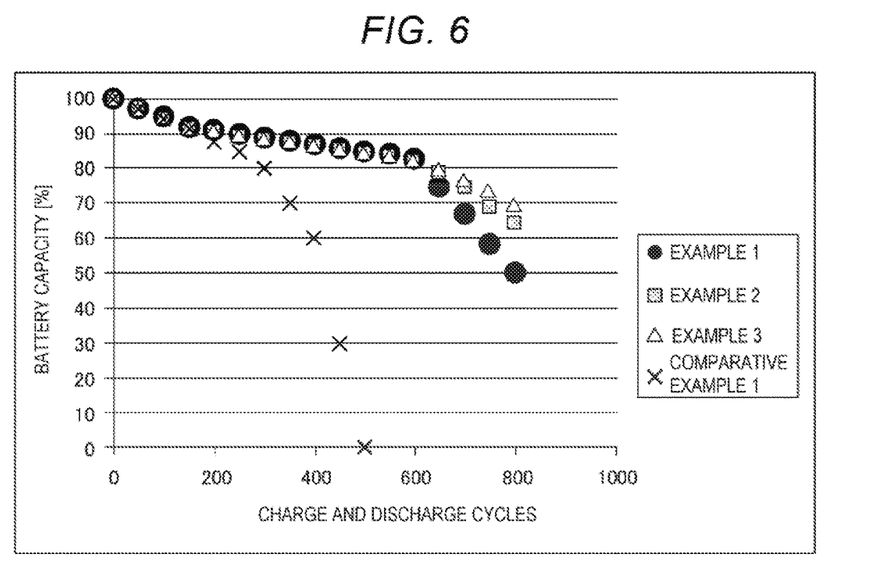
FIG. 6 is a diagram representing the result of a charge and discharge cycle characteristics evaluation of lithium-ion batteries of Examples and Comparative Example.

FIG. 3 is a diagram illustrating a configuration of the separator of Example 1. FIG. 4 is a diagram illustrating a configuration of the separator of Example 2. FIG. 5 is a diagram illustrating a configuration of the separator of Example 3. FIG. 6 is a diagram representing the result of a charge and discharge cycle characteristics evaluation of lithium-ion batteries of Examples and Comparative Example.

EXAMPLE 1

A lithium-ion battery of Example 1 was fabricated by introducing a metal foreign object to the positive electrode active material 1a of First Embodiment in an amount of 100 ppm with respect to the mass of the positive electrode active material 1a. The metal foreign object had a diameter ϕ of 20 μm to 30 μm, and iron, copper, zinc, tin, cobalt, nickel, and chromium were used. The separator 3 used did not have the separation functional layer 3a on the side walls 10 of the support layer 3b.

Specifically, in the separator 3 of Example 1, the separation functional layer 3a contacts the negative electrode plate 2 only at a first surface 8 of the separator 3, and the support layer 3b contacts the positive electrode plate 1 only at a second surface 9 of the separator 3, as shown in FIG. 3. Because of this configuration, the separation functional layer 3a is not formed in positions that contact the side walls 10 facing the positive electrode tab 4 and the negative electrode tab 5 of the support layer 3b.

EXAMPLE 2

A lithium-ion battery of Example 2 was fabricated by introducing a metal foreign object to the positive electrode active material 1a of First Embodiment in an amount of 100 ppm with respect to the mass of the positive electrode active material 1a. The metal foreign object had a diameter ϕ of 20 μm to 30 μm, and iron, copper, zinc, tin, cobalt, nickel, and chromium were used. The separator 3 used had the separation functional layer 3a disposed in contact with the side walls 10 of the support layer 3b, as shown in FIG. 4. Specifically, the separation functional layer 3a is formed in positions that contact the negative electrode plate 2, and the side walls 10 of the support layer 3b.

EXAMPLE 3

A lithium-ion battery of Example 3 was fabricated by introducing a metal foreign object to the positive electrode active material 1a of First Embodiment in an amount of 100 ppm with respect to the mass of the positive electrode active material 1a. The metal foreign object had a diameter ϕ of 20 μm to 30 μm, and iron, copper, zinc, tin, cobalt, nickel, and chromium were used. The separator 3 used had the separation functional layer 3a disposed also on the side walls 10 of the support layer 3b, and was thinner at the central portion than at the ends (the positive electrode tab side and the negative electrode tab side). Specifically, the separation functional layer 3a has a thickness T3a that is thinner at the central portion between the positive electrode tab 4 (see FIG. 1) and the negative electrode tab 5 (see FIG. 1) than on the outer sides toward the positive electrode tab 4 (see FIG. 1) and the negative electrode tab 5 (see FIG. 1). Here, the thickness is gradually varied to avoid localized concentration of applied stress. In Example 3, the separation functional layer 3a is described as being disposed also on the side walls 10 of the support layer 3b. However, the separation functional layer 3a can have a thickness that is thinner at the central portion than at the ends also in a configuration in which the separation functional layer 3a is not disposed on the side walls 10 of the support layer 3b.

COMPARATIVE EXAMPLE 1

A lithium-ion battery of Comparative Example 1 was fabricated by introducing a metal foreign object to the positive electrode active material 1a of First Embodiment in an amount of 100 ppm with respect to the mass of the positive electrode active material 1a. The metal foreign object had a diameter ϕ of 20 μm to 30 μm, and iron, copper, zinc, tin, cobalt, nickel, and chromium were used. The separator used did not have the separation functional layer.

The lithium-ion batteries of Examples 1 to 3 and Comparative Example 1 fabricated under the foregoing conditions were tested by performing a charge and discharge test in a 25° C. atmosphere under a constant current and a constant amount of energy charge with a charging current of 1.8 mA, and an amount of energy charge of 5.4 mAh (the upper limit voltage 4.2 V, and the lower limit voltage 3.0 V). The results are presented in FIG. 6.

As is clear from the results shown in FIG. 6, Examples 1 to 3 have more desirable charge and discharge cycle characteristics than Comparative Example 1. Specifically, the battery capacity drop after repeated charge and discharge is smaller in the lithium-ion batteries of Examples 1 to 3 configured from the separator having the separation functional layer 3a than in the lithium-ion battery of Comparative Example 1 using the separator configured as in related art.

A large battery performance drop was observed in Comparative Example 1 as a result of introducing the metal foreign object (iron, copper, zinc, tin, cobalt, nickel, or chromium with a diameter ϕ of 20 μm to 30 μm) to the positive electrode active material 1a in an amount of 100 ppm with respect to the mass of the positive electrode active material 1a. This is believed to be due to the ionized metal foreign objects on the positive electrode side moving toward the negative electrode side and precipitating on the surface of the negative electrode plate 2, and growing toward the positive electrode plate 1 and causing internal shorting between the positive electrode plate 1 and the negative electrode plate 2.

On the other hand, in the lithium-ion batteries of Examples 1 to 3 using the separator 3 including at least the separation functional layer 3a, the average pore size of the separation functional layer is smaller than the polyvalent ions solvated in the electrolytic solution, and is larger than lithium ions. The separation functional layer 3a has pores with a pore size of 0.6 nm to 2 nm, and a porosity of 10% to 30%. The various ions in the electrolytic solution are in a solvated state, adsorbing the solvent according to the amount of charge. Ions with higher valency are thus more likely to be larger upon being solvated.

In a solvated state, divalent and higher ions, such as iron, copper, zinc, tin, cobalt, nickel, and chromium are thus larger than the monovalent lithium ions. The movement of metal foreign object ions from the positive electrode side to the negative electrode side can thus be inhibited while allowing passage of lithium ions. This makes it possible to reduce an output voltage drop of the lithium-ion battery, or prevent poor battery performance and poor safety due to heat or fire from the lithium-ion battery. This ensures the battery performance and safety of the lithium-ion battery.

The following explains the charge and discharge cycle characteristics of Examples 1 to 3, with regard to the improving levels of charge and discharge cycle characteristics from Example 1 to Example 3.

In Example 1, the separation functional layer 3a is disposed only between the support layer 3b and the negative electrode plate 2, and is not disposed on the side walls of the support layer 3b. When metal impurities are present in large quantities in the positive electrode plate 1, it is thought that ionized metal impurities reach the negative electrode plate 2 by passing between the side walls 10 of the support layer 3b of the separator 3 and the positive and negative electrode tabs 4 and 5 by capillary action, and precipitate on the negative electrode plate 2, even though ionized metal impurities are inhibited from diffusing in the vicinity of the positive electrode plate 1, and reaching the negative electrode plate 2 through the separation functional layer 3a.

On the other hand, in Example 2, the separation functional layer 3a is disposed also on the side walls of the support layer 3b, and the passage of metal impurities between the side walls 10 of the support layer 3b of the separator 3 and the positive and negative electrode tabs 4 and 5 can be inhibited. This appears to be the reason for hardly any passage of ionized metal foreign objects unlike that observed in Example 1. This probably accounts for the more desirable charge and discharge cycle characteristics of Example 2 than that of Example 1.

The electrolytic solution more easily passes through the support layer 3b than the separation functional layer 3a because the latter is a denser film with a smaller pore size and a lower porosity. The thickness of the separation functional layer 3a is thus chosen to be a thickness that inhibits passage of metal foreign object ions without preventing a flow of the electrolytic solution. In the case of Example 2, as shown in FIG. 4, because of a sufficiently thin thickness T3a of the separation functional layer 3a, a thickness T3av of the separator 3 spanning across the separation functional layer 3a along the flow direction of the electrolytic solution on the side walls of the support layer 3b is almost the same as a thickness T3b of the support layer 3b, and there is hardly any passage of metal foreign object ions in these portions. On the other hand, when a thickness T3ah of the separation functional layer 3a disposed on the side walls 10 of the support layer 3b is thick in a direction perpendicular to the flow direction of the electrolytic solution, the support layer 3b becomes narrower in a direction perpendicular to the flow of the electrolytic solution, and the flow of the electrolytic solution is blocked by the corresponding amount. It is therefore more desirable that the thickness T3ah of the separation functional layer 3a disposed on the side walls of the support layer 3b be thinner than the thickness T3a of the separation functional layer 3a disposed on the surface of the support layer 3b.

Changes that typically occur in the electrode shape of a lithium-ion battery due to charge and discharge are described below. The negative electrode plate 2 expands about 10%, and the positive electrode plate 1 expands about 2% while charging a lithium-ion battery, though the values vary with the electrode plate specifications. During the discharge, the positive electrode plate 1 and the negative electrode plate 2 almost fully restore their original shapes. However, the extruded electrolytic solution does not immediately return to the original state. Because of the expansion of the electrode plates during the charging, the innermost central portion of the electrode plate group experiences the pressure that reduces the amount of the contained electrolytic solution almost in half. Such stress and the nonuniformity of electrolytic solution amount represent a factor that causes poor charge and discharge cycle characteristics.

The separation functional layer 3a of Example 3 is thinner at the central portion than at the ends (the positive electrode tab side, and the negative electrode tab side). The low-porosity layer thus does not interfere with passage of the liquid as much as in Example 2 at the central portion relative to the ends, and more easily allows the electrolytic solution to pass at the central portion to reduce the nonuniformity of electrolytic solution amount. This probably accounts for the more desirable charge and discharge cycle characteristics of Example 3 than that of Example 2.

In First Embodiment, the positive electrode plate 1, the negative electrode plate 2, and the separator 3 are disposed in such an orientation that the support layer 3b and the separation functional layer 3a contact the positive electrode active material 1a and the negative electrode active material 2a, respectively, upon being wrapped. However, the effect to inhibit movement of metal foreign object ions as observed in Examples 1 to 3 also can be obtained when the positive electrode plate 1, the negative electrode plate 2, and the separator 3 are disposed in such an orientation that the separation functional layer 3a and the support layer 3b contact the positive electrode active material 1a and the negative electrode active material 2a, respectively, upon being wrapped.

However, when the separation functional layer 3a is in contact with the positive electrode active material 1a that more easily ionizes metal foreign objects, locally increased concentrations of metal foreign object ions come into contact with the separation functional layer 3a, increased amounts of metal foreign object ions pass through the separation functional layer 3a even when the separation functional layer 3a has a high block rate for metal foreign object ions. On the other hand, when the support layer 3b is in contact with the positive electrode active material 1a, and metal foreign object ions reach the separation functional layer 3a through the support layer 3b, the metal foreign object ions pass in relatively smaller amounts because the concentration of metal foreign object ions decreases as they diffuse in their passage through the support layer 3b. Accordingly, fewer metal foreign objects precipitate on the surface of the negative electrode plate 2, and desirable charge and discharge cycle characteristics and safety can be obtained.

The separator 3 used in Example 3 was evaluated with regard to the lithium block rate, and the block rate for the metal foreign object iron, copper, zinc, tin, cobalt, nickel, and chromium. The results are presented in Table 1.

The block rate was evaluated using the block rate R of the separator for the separation target as an index, as follows:

Block rate $R=(1-C2\div C1)\times 100$, where C1 is the concentration of the target substance on the liquid supply side of the separator, and C2 is the concentration of the target substance on the side of the permeated liquid. Here, a solution prepared by adding a certain quantity of lithium trifluoromethanesulfonate, iron trifluoromethanesulfonate, copper trifluoromethanesulfonate, zinc trifluoromethanesulfonate, tin trifluoromethanesulfonate, cobalt trifluoromethanesulfonate, nickel trifluoromethanesulfonate, or chromium trifluoromethanesulfonate to ethylene carbonate was used as the supplied liquid.

A solution that came out of the separator upon applying a pressure of about 0.3 MPa to the liquid supply side was obtained as the permeated liquid. The block rate (%) for each substance was then calculated using the foregoing formula after measuring the concentrations of lithium, iron, copper, zinc, tin, cobalt, nickel, and chromium contained in the supplied liquid and the permeated liquid. The block rate for each substance is denoted as RLi, RFe, RCu, RZn, RSn, RCo, RNi, RCr.

TABLE 1

| Target substance | Block rate [%] |
| --- | --- |
| Lithium | 1 |
| Iron | 95 |
| Copper | 97 |
| Zinc | 97 |
| Tin | 97 |
| Cobalt | 96 |
| Nickel | 96 |
| Chromium | 94 |

As is clear from Table 1, the block rates RFe, RCu, RZn, RSn, RCo, RNi, RCr for iron, copper, zinc, tin, cobalt, nickel, and chromium are higher than the lithium block rate RLi in the separator 3 used in Example 3. This is because iron, copper, zinc, tin, cobalt, nickel, and chromium are all polyvalent ions, and produce very different ion sizes from the ion size of the monovalent lithium ions upon being solvated. The separator 3 used in the lithium-ion battery of the present embodiment takes advantage of this ion size difference, and functions to allow passage of lithium, required for battery reaction, through the separator, and block movement of the separation target metal foreign objects by the separator 3, as demonstrated above.

The separation performance and the block rate of the separator are described below.

The lithium block rate RLi, and the block rates RFe, RCu, RZn, RSn, RCo, RNi, and RCr for the metal foreign object iron, copper, zinc, tin, cobalt, nickel, and chromium take larger values than those shown in Table 1 when the pore size, the porosity, and the block size are smaller than those of the separators 3 used in Examples 1 to 3 (when the porosity is less than 50%). Specifically, the separator blocks not only the metal foreign objects across the positive and negative electrodes, but movement of the lithium required for battery reaction. This makes the separator unsuited for a lithium-ion battery.

The lithium block rate RLi, and the block rates RFe, RCu, RZn, RSn, RCo, RNi, and RCr for the metal foreign object iron, copper, zinc, tin, cobalt, nickel, and chromium take smaller values than those shown in Table 1 when the pore size, the porosity, and the block size are larger than those of the separators 3 used in Examples 1 to 3 (when the porosity is above 80%). Specifically, the separator passes not only lithium but the metal foreign objects. The intended effect of the present disclosure cannot be obtained in this case.

It was found from these results that the block rates RFe, RCu, RZn, RSn, RCo, RNi, and RCr for iron, copper, zinc, tin, cobalt, nickel, and chromium need to be sufficiently larger than the lithium block rate RLi.

INDUSTRIAL APPLICABILITY

The present disclosure can ensure battery performance and safety, and is useful in applications such as a lithium-ion battery that includes a separator between positive and negative electrodes.

What is claimed is:

1. A lithium-ion battery comprising:
a positive electrode plate containing a lithium metal oxide as a positive electrode active material;
a negative electrode plate containing carbon as a negative electrode active material;
a separator having a first surface, and a second surface opposite the first surface, the separator being disposed between the positive electrode plate and the negative electrode plate with the first surface contacting the negative electrode plate, and the second surface contacting the positive electrode plate; and
an electrolytic solution of a lithium ion dissolved as an electrolyte in an organic solvent,
wherein the separator includes a support layer, and a separation functional layer having a smaller pore size and a lower porosity than the support layer,
wherein the separation functional layer has the porosity of at most 1%, and at least above 0%
wherein an average thickness of the separation functional layer is from 10 nm to 100 nm, wherein the separation functional layer has an average pore diameter of from 0.3 nm to 0.8 nm, and wherein the separator includes the separation functional layer on at least one of a side of the first surface and a side of the second surface.

2. The lithium-ion battery according to claim 1, wherein the separation functional layer is disposed on the side of the first surface of the separator, and wherein the support layer is disposed on the side of the second surface.

3. The lithium-ion battery according to claim 2, wherein an average thickness of the separation functional layer is smaller than an average thickness of the support layer.

4. The lithium-ion battery according to claim 2, wherein the pore size of the separation functional layer on average is smaller than an ion solvated by the electrolytic solution, and is larger than a solvated lithium ion.

5. The lithium-ion battery according to claim 2, wherein the separator blocks movement of at least one of iron, copper, zinc, tin, cobalt, nickel, and chromium ions between the first surface and the second surface at a higher rate than the rate at which movement of lithium present in the electrolytic solution is blocked by the separator between the first surface and the second surface.

6. The lithium-ion battery according to claim 2, wherein the separation functional layer is made of any one of regenerated cellulose, a cellulose ester, polyacrylnitrile, Teflon, a polyester-based polymer alloy, a polyamide, a polyimide, a polysulfone, a polyether sulfone, polyethylene, polypropylene, polyvinylidene fluoride, a polyvinyl alcohol, an ethylene-vinyl copolymer, and polyvinyl chloride.

7. The lithium-ion battery according to claim 2, wherein the support layer is made of any one of regenerated cellulose, a cellulose ester, a polysulfone, a polyether sulfone, a polyvinyl alcohol, an ethylene-vinyl alcohol copolymer, vinylon, a polyamide, a polyimide, polyethylene, polypropylene, polyester, and polyvinylidene fluoride.

8. The lithium-ion battery according to claim 2, wherein the separation functional layer is also formed in a region that is in contact with side walls of the support layer.

9. The lithium-ion battery according to claim 8, wherein the separation functional layer is thinner in a portion that is in contact with the side walls than in a portion that is in contact with the positive electrode plate or the negative electrode plate.

10. The lithium-ion battery according to claim 2, wherein the separation functional layer is thicker toward side wall sides of the support layer in a portion that is in contact with the positive electrode plate or the negative electrode plate.

* * * * *